United States Patent
Austin et al.

(10) Patent No.: US 10,428,210 B2
(45) Date of Patent: Oct. 1, 2019

(54) POLYOLEFIN ADHESIVE COMPOSITIONS FOR ELASTIC APPLICATIONS

(71) Applicant: ExxonMobil Chemical Patents Inc., Baytown, TX (US)

(72) Inventors: Jennifer J. Austin, The Woodlands, TX (US); Sunny Jacob, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 82 days.

(21) Appl. No.: 15/514,369

(22) PCT Filed: Aug. 14, 2015

(86) PCT No.: PCT/US2015/045245
§ 371 (c)(1),
(2) Date: Mar. 24, 2017

(87) PCT Pub. No.: WO2016/069089
PCT Pub. Date: May 6, 2016

(65) Prior Publication Data
US 2017/0283603 A1    Oct. 5, 2017

Related U.S. Application Data

(60) Provisional application No. 62/072,081, filed on Oct. 29, 2014.

(51) Int. Cl.
| | | |
|---|---|---|
| C08L 23/16 | (2006.01) | |
| C09J 123/14 | (2006.01) | |
| C09J 5/06 | (2006.01) | |
| C09J 7/20 | (2018.01) | |
| C09J 7/35 | (2018.01) | |
| C09J 7/24 | (2018.01) | |

(52) U.S. Cl.
CPC .......... C08L 23/16 (2013.01); C09J 5/06 (2013.01); C09J 7/20 (2018.01); C09J 7/243 (2018.01); C09J 7/35 (2018.01); C09J 123/142 (2013.01); C09J 123/14 (2013.01); C09J 2423/10 (2013.01); C09J 2423/106 (2013.01)

(58) Field of Classification Search
CPC ............... C08L 23/16; C09J 5/06; C09J 7/20
USPC .......................................................... 524/57
See application file for complete search history.

(56) References Cited

U.S. PATENT DOCUMENTS

| | | |
|---|---|---|
| 5,844,009 A | 12/1998 | Hurley et al. |
| 5,883,145 A | 3/1999 | Hurley et al. |
| 6,376,057 B1 | 4/2002 | Akao et al. |
| 6,455,637 B1 | 9/2002 | Jackson et al. |
| 6,472,015 B1 | 10/2002 | Hurley et al. |
| 6,642,316 B1 | 11/2003 | Datta et al. |
| 6,794,453 B2 | 9/2004 | Jackson et al. |
| 7,294,681 B2 | 11/2007 | Jiang et al. |
| 7,524,910 B2 | 4/2009 | Jiang et al. |
| 8,358,291 B2 | 1/2013 | Liang |
| 2002/0151647 A1 | 10/2002 | Laughner et al. |
| 2005/0107529 A1* | 5/2005 | Datta ............... C08F 210/06 525/70 |

FOREIGN PATENT DOCUMENTS

| | | |
|---|---|---|
| EP | 0 374 695 | 6/1990 |
| EP | 0 510 559 | 10/1992 |
| EP | 1 003 814 | 5/2000 |
| WO | 2005/003199 | 1/2005 |
| WO | 2005/049672 | 6/2005 |
| WO | 2013/134038 | 9/2013 |

* cited by examiner

*Primary Examiner* — Hui H Chin

(57) ABSTRACT

The present invention is related to an article comprising a substrate, having at least one propylene terpolymer comprising propylene derived units, one or more dienes, and an alpha-olefin content of less than about 35 wt % of the propylene terpolymer; and an adhesive composition, having about 20 to about 80 wt % of a polymer blend comprising a first propylene-based polymer, that is a homopolymer of propylene or a copolymer of propylene and ethylene or a $C_4$ to $C_{10}$ alpha-olefin, and a second propylene-based polymer, that is a homopolymer of propylene or a copolymer of propylene and ethylene or a $C_4$ to $C_{10}$ alpha-olefin; wherein the second propylene-based polymer is different than the first propylene-based polymer; and wherein the adhesive composition is applied to the substrate at temperature of less than about 150° C.

13 Claims, No Drawings

POLYOLEFIN ADHESIVE COMPOSITIONS FOR ELASTIC APPLICATIONS

PRIORITY

This application claims priority to U.S. Application Ser. No. 62/072,081 filed Oct. 29, 2014, the disclosure of which is fully incorporated herein by reference.

FIELD OF INVENTION

The invention relates to an article comprising an elastomeric composition and a polyolefin adhesive composition.

BACKGROUND

Materials with good stretchability and elasticity are used to manufacture a variety of nonwoven disposable articles in addition to durable articles including incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer.

While numerous materials are known to exhibit excellent stress-strain properties and elasticity at room temperatures, it is often desirable for elastic materials to provide a conforming or secure fit during repeated use, during extensions and retractions at elevated or depressed temperatures, or in automobile interiors during summer months. Elasticity at elevated temperatures is also important for maintaining tight tolerances throughout temperature cycles. In particular, elastic materials used for repeated wear clothing or garments must maintain their integrity and elastic performance after laundering.

Spandex, a segmented polyurethane urea elastic material, is currently used in various durable fabrics. However, articles made from spandex can lose integrity, shape, and elastic properties when subjected to elevated temperatures and polyurethane-based components are costly and do not readily adhere to olefinic adhesives. U.S. Pat. No. 8,358,291 discloses a method of making an elastomeric article from a propylene-based material having good thermal resistance, resistance, stretchability, and elasticity.

To prepare nonwoven articles, hot melt adhesive (HMA) compositions are generally used to adhere one or more layers of film and/or fabric. For such articles, HMA compositions are sought that provide a desired combination of physical properties such as stable adhesion over time indicative of broad application temperature ranges, and machine coatability. Exemplary base polymer compositions and methods of making polymer compositions for HMA applications are disclosed in U.S. Pat. Nos. 7,294,681 and 7,524,910. Various polymers described in these patents and/or produced by the methods disclosed in these patents have been sold by ExxonMobil Chemical Company as LINXAR™ polymers. International Publication No. WO2013/134038 discloses a method for producing a novel polymer blend having at least two different propylene-based polymers produced in parallel reactors. The multi-modal polymer blend has a Mw of about 10,000 g/mol to about 150,000 g/mol.

Although many different types of polymers are known and have been used in HMA formulations, such as those using spandex or Lycra®, nonwoven articles are often prepared using adhesive compositions having high application temperatures, around the order of greater than 150° C. For olefin-based elastomers, the integrity of the elastomeric composition can be compromised when adhesives are applied at temperatures above 150° C. Accordingly, there is a need for an adhesive composition that can be applied at an application temperature of lower than 150° C. to bind one or more elastomeric articles for manufacturing of a variety of nonwoven applications.

SUMMARY

The foregoing and/or other challenges are addressed by the methods and products disclosed herein.

In one aspect, an article is provided for, where the article comprises (a) a substrate, wherein the substrate comprises at least one propylene terpolymer comprising propylene derived units, one or more dienes, and one or more $C_2$ or $C_4$ to $C_{20}$ alpha-olefins, where the $C_2$ or $C_4$ to $C_{20}$ alpha-olefin content is less than about 35 wt % of the propylene terpolymer; and (b) an adhesive composition, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend is present in the amount of about 20 to about 80 wt % of the adhesive composition; wherein the adhesive composition is applied to the substrate at temperature of less than about 150° C.

In another aspect, an article is provided, where the article comprises a blend of (a) a composition, wherein the elastomeric composition comprises at least one propylene terpolymer comprising propylene derived units, one or more dienes, and one or more $C_2$ or $C_4$ to $C_{20}$ alpha-olefins, where the $C_2$ or $C_4$ to $C_{20}$ alpha-olefin content is less than about 35 wt % of the propylene terpolymer; and (b) an adhesive composition, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend is present in the amount of about 20 to about 80 wt % of the adhesive composition.

In yet another aspect, a method of applying an adhesive composition to a substrate is provided, where the method comprises the steps of preparing a substrate, wherein the substrate comprises at least one propylene terpolymer comprising propylene derived units, one or more dienes, and one or more $C_2$ or $C_4$ to $C_{20}$ alpha-olefins, where the $C_2$ or $C_4$ to $C_{20}$ alpha-olefin content is less than about 35 wt % of the propylene terpolymer; and applying an adhesive composition to the substrate at a temperature of less than about 150° C., wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend is present in the amount of about 20 to about 80 wt % of the adhesive composition.

These and other aspects of the present inventions are described in greater detail in the following detailed description and are illustrated in the accompanying figures and tables.

DETAILED DESCRIPTION

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. "Propylene-based" or "predominantly propylene-based" as used herein, is meant to include any polymer comprising propylene, either alone or in combination with one or more comonomers, in which propylene is the major component (i.e., greater than about 50 mol % propylene).

A. Methods of Preparing Adhesive Components and Compositions

A solution polymerization process for preparing a polyolefin adhesive component is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene is a particularly preferred comonomer for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second reactor may receive a third monomer feed of a third monomer, a fourth monomer feed of a fourth monomer, and a catalyst feed of a second catalyst. The second reactor may also receive feeds of a solvent and activator. The solvent and/or the activator feed may be combined with any of the third monomer feed, the fourth monomer feed, or second catalyst feed, or the solvent and activator may be supplied to the reactor in separate feed streams. A second polymer is produced in the second reactor and is evacuated from the second reactor via a second product stream. The second product stream comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor may be designed to produce a polymer that is predominantly propylene, i.e., a polymer that is more than 50 mol % propylene. In another embodiment, the second reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous blends are described in greater detail herein.

It should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor and second reactor or the third reactor may be in series with one of the first reactor and second reactor.

Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis (2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art. International Publication No. WO2013/134038, incorporated herein by reference, generally describes the method of preparing polyolefin adhesive components and compositions.

Polymers for Use in Adhesive Compositions

Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer blend" as used herein includes, but is not limited to a blend of one or more polymers prepared in solution or by physical blending, such as melt blending.

In any embodiment, one or more polymers of the blend may comprise one or more propylene-based polymers, which comprise propylene and from about 2 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 120° C., or less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the crystallization temperature of the polymer blend (as determined by DSC) is less than about 110° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}$C NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Pat. No. 7,232,871.

The semi-crystalline polymer may have a tacticity index m/r ranging from a lower limit of 4, or 6 to an upper limit of 10, or 20, or 25. The tacticity index, expressed herein as "m/r", is determined by $^{13}$C nuclear magnetic resonance ("NMR"). The tacticity index m/r is calculated as defined by H. N. Cheng in 17 MACROMOLECULES, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm³ to about 0.92 g/cm³, or from about 0.86 g/cm³ to about 0.90 g/cm³, or from about 0.86 g/cm³ to about 0.89 g/cm³ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and do/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_O c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, P(θ) is the form factor for a monodisperse random coil (described in the above reference), and $K_O$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

The polymers that may be used in the adhesive compositions disclosed herein generally include any of the polymers according to the process disclosed in International Publication No. WO2013/134038, incorporated herein by reference. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

Polymers and blended polymer products are also provided. In any embodiment, one or more of the polymers described herein may be blended with another polymer, such as another polymer described herein, to produce a physical blend of polymers.

Preferably, the polymer blend has a melt flow rate (MFR, 2.16 kg weight @ 230° C.), of greater than about 1,000 g/10 min to less than about 10,000 g/10 min as measured according to the ASTM D-1238(A) test method as modified (described below). Preferably, the MFR of the polymer blend is from greater than about 1,500 g/10 min, or about 2,000 g/10 min, to less than about 3,500 g/10 min, or about 5,000 g/10 min, or about 7,500 g/10 min.

Preferably, the polymer blend is present in the adhesive composition in the amount of about 20 wt % to about 80 wt %, preferably about 40 wt % to about 70 wt %, preferably about 50 wt % to about 60 wt % based on the adhesive composition.

Catalysts/Activators to Prepare Adhesive Compositions

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si—, N— or P— containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3',5'-di-tert-butylphenyl)indenyl) zirconium dimethyl, (dimethylsilyl)bis(2-methyl-4-(3',5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a $—(CH_2)_a—$ group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

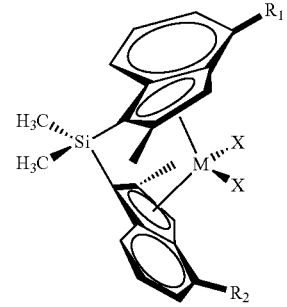

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, [Y]$^-$. In any embodiment, the anionic component may be a non-coordinating anion (NCA), having the formula [B(R$^4$)$_4$]$^-$, where R$^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl)borate.

Suitable activators for the processes of the present invention also include aluminoxanes (or alumoxanes) and aluminum alkyls. Without being bound by theory, an alumoxane is typically believed to be an oligomeric aluminum compound represented by the general formula (R$^x$—Al—O)$_n$, which is a cyclic compound, or R$^x$ (R$^x$—Al—O)$_n$ AlR$^x_2$, which is a linear compound. Most commonly, alumoxane is believed to be a mixture of the cyclic and linear compounds. In the general alumoxane formula, R$^x$ is independently a C$_1$-C$_{20}$ alkyl radical, for example, methyl, ethyl, propyl, butyl, pentyl, isomers thereof, and the like, and n is an integer from 1-50. In any embodiment, R$^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula R$^x$JZ$_2$ where J is aluminum or boron, R$^x$ is a C$_1$-C$_{20}$ alkyl radical, for example, methyl, ethyl, propyl, butyl, pentyl, and isomers thereof, and each Z is independently R$^x$ or a different univalent anionic ligand such as halogen (Cl, Br, I), alkoxide (OR$^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents Used to Prepare Adhesive Compositions

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated C$_6$ to C$_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

International Publication No. WO2013/134038, incorporated herein by reference, generally describes the catalysts, activators, and solvents used to prepare the polymer blend used in the adhesive compositions.

Tackifiers for Use in Adhesive Compositions

The term "tackifier" is used herein to refer to an agent that allows the polymer of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA solidifying.

"Softening Point" is the temperature, measured in ° C., at which a material will flow, as determined by ASTM E-28. The one or more tackifiers used in the adhesive composition of the present invention preferably have a softening point of about 90° C. to about 120° C.

Although the exemplary formulations disclosed herein focus on formulations in which one or more tackifiers are blended with one or more polymer blends, adhesive formulations having no tackifier or substantially no tackifier are also contemplated. In embodiments, other tackifiers may be used with the polymer blends of the invention including, but not limited to, alkylphenolic, coumarone indene, other hydrogenated or non-hydrogenated hydrocarbon resins, hydroxylated polyester resin, phenolic, pure monomer styrene, resin dispersion, rosin ester, rosin, and terpene tackifiers.

Additives: Plasticizer, Wax, Antioxidant for Use in Adhesive Compositions

The HMA composition can include other additives, e.g., plasticizers, waxes, antioxidants, and combinations thereof either alone or in combination with one or more tackifiers disclosed herein. The HMA composition can also include one or more polymer additives, either alone or in combination with one or more tackifiers, plasticizers, waxes, or antioxidants, and combinations thereof as disclosed herein.

The term "plasticizer" or "oil" is used herein to refer to a substance that improves the fluidity of a material. Useful commercial available plasticizers include Primol™ 352, Krystol™ 550, and Nyflex™ 222B. Primol™ 352 is a white oil available from ExxonMobil Chemical. Krystol™ 550 is a white oil available from Petro-Canada Lubricants. Nyflex™ 222B is a solvent refined naphthenic oil available from Nynas AB, located in Stockholm, Sweden. Preferably, the oil is present in the adhesive composition in the amount of up to about 30 wt % of the adhesive composition, preferably from about 5 to about 25 wt %, preferably from about 10 to about 20 wt %, preferably about 15 to about 25 wt %.

The term "antioxidant" is used herein to refer to high molecular weight hindered phenols and multifunctional phenols. A useful commercially available antioxidant is Irganox™ 1010. Irganox 1010 is a hindered phenolic antioxidant available from BASF SE Corporation located in Ludwigshafen, Germany. The invention is not limited to Irganox 1010 as the antioxidant. In embodiments, other antioxidants that may be used with the polymer blends of the invention, including, but are not limited to amines, hydroquinones, phenolics, phosphites, and thioester antioxidants.

The term "wax" is used herein to refer to a substance that reduces the overall viscosity of the adhesive composition. The primary function of wax is to control the set time and cohesion of the adhesive system. Adhesive compositions of the present invention may comprise paraffin (petroleum) waxes and microcrystalline waxes. In embodiments, the adhesive compositions of the present invention may comprise no wax. In embodiments, waxes may be used with the polymer blends of the invention including, but not limited to, Castor Oil derivatives (HCO-waxes), ethylene co-terpolymers, Fisher-Tropsch waxes, microcrystalline, paraffin, polyolefin modified, and polyolefin. Preferably, the wax is present in the adhesive composition in the amount of up to about 15 wt % of the adhesive composition, preferably from about 5 to about 10 wt %, preferably about 15 wt %.

B. Methods of Preparing Compositions/Substrates

In an embodiment of the present invention, the propylene-α-olefin-diene terpolymer is an elastomeric composition. As used herein, the term "elastomer" means a polymer that has the ability to be stretched to at least twice its original length and retract very rapidly to approximately its original length when released. Such propylene terpolymers may be combined with optional additives, and the elastomeric composition may be crosslinked with the addition of a curing agent.

In at least one embodiment, the propylene terpolymer is prepared by polymerizing propylene with one or more dienes. For example, the propylene-based polymer can be prepared by polymerizing propylene with ethylene and/or at least one $C_4$-$C_{20}$ α-olefin, or a combination of ethylene and at least one $C_4$-$C_{20}$ α-olefin and one or more dienes. The one or more dienes can be conjugated or non-conjugated. Preferably, the one or more dienes are non-conjugated.

The alpha olefin comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include but are not limited to 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. Preferably, the diene is ENB.

Preferred methods and catalysts for producing the propylene terpolymers are found in U.S. Pat. Nos. 7,232,871 and 6,881,800 and International Publication No. WO05/049672, which are all incorporated by reference herein. Pyridine amine complexes, such as those described in International Publication No. WO03/040201 are also useful to produce the propylene terpolymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see EP1070087. The catalyst described in EP1614699 could also be used for the production of backbones suitable for the invention.

The propylene terpolymers can have an average propylene content on a weight percent basis of from about 60 wt % to about 99.7 wt %, more preferably from about 60 wt % to about 99.5 wt %, more preferably from about 60 wt % to about 97 wt %, more preferably from about 65 wt % to about 95 wt % based on the weight of the polymer. In one embodiment, the balance comprises one or more dienes and one or more of the α-olefins described previously. In one or more embodiments above or elsewhere herein, the alpha-olefin is ethylene, butene, hexene, or octene. In other embodiments, two alpha-olefins are present, preferably ethylene and one of butene, hexene, or octene.

Preferably, the propylene terpolymer comprises about 0.2 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In one or more embodiments above or elsewhere herein, the propylene terpolymer comprises ENB in an amount of from about 0.2 to about 4 wt %, more preferably from about 0.5 to about 2.5 wt %, and more preferably from about 0.5 to about 2.0 wt %.

In other embodiments, the propylene terpolymer preferably comprises propylene and diene in one or more of the ranges described above with the balance comprising one or more of $C_2$ and/or $C_4$-$C_{20}$ olefins. In general, this will amount to the propylene terpolymer preferably comprising from about 5 to about 40 wt % of one or more $C_2$ and/or $C_4$-$C_{20}$ olefins based the weight of the polymer, preferably less than about 25 wt %. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene terpolymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene terpolymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In one or more embodiments above or elsewhere herein, the propylene terpolymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene terpolymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene terpolymer can be about 1.5 to 40. In an embodiment the MWD can have an upper limit of 40, or 20, or 10, or 5, or 4.5, and a lower limit of 1.5, or 1.8, or 2.0. Techniques for determining the molecular weight (Mn and Mw) and molecular weight distribution (MWD) can be found in U.S. Pat. No. 4,540,753 (Cozewith, Ju and Verstrate) (which is incorporated by reference herein) and references cited therein, in Macromolecules, 1988, Volume 21, p. 3360 (Verstrate et al.), which is herein incorporated by reference for purposes of, and references cited therein, and in accordance with the procedures disclosed in U.S. Pat. No. 6,525,157, column 5, lines 1-44, which patent is hereby incorporated by reference in its entirety.

In one or more embodiments above or elsewhere herein, the propylene terpolymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight (Mv) as the propylene-based polymer. $\eta_l=KM_v^\alpha$, K and α were measured values for linear polymers and should be obtained on the same instrument as the one used for the g' index measurement.

In one or more embodiments above or elsewhere herein, the propylene terpolymer can have a density of about 0.85 g/cm³ to about 0.92 g/cm³, more preferably, about 0.87 g/cm³ to 0.90 g/cm³, more preferably about 0.88 g/cm³ to about 0.89 g/cm³ at room temperature as measured per the ASTM D-1505 test method.

In one or more embodiments above or elsewhere herein, the propylene terpolymer can have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) is from about 0.5 g/10 min to about 200 g/10 min and more preferably from about 1 g/10 min to about 100 g/10 min. In an embodiment, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min, more preferably 10 g/10 min to about 25 g/10 min, or more preferably 2 g/10 min to about 10 g/10 min.

The propylene terpolymer can have a Mooney viscosity ML (1+4)@125° C., as determined according to ASTM D1646, of less than 100, more preferably less than 75, even more preferably less than 60, most preferably less than 30.

In one or more embodiments above or elsewhere herein, the propylene terpolymer can have a heat of fusion (Hf) measured by Differential Scanning calorimetry (DSC), which is greater than or equal to about 0.5 Joules per gram (J/g), and is ≤about 80 J/g, preferably ≤about 75 J/g, preferably ≤about 70 J/g, more preferably ≤about 60 J/g, more preferably ≤about 50 J/g, more preferably ≤about 35 J/g. In another embodiment, the propylene terpolymers can have a heat of fusion (Hf), which is from about 0.5 J/g to about 75 J/g, preferably from about 1 J/g to about 75 J/g, more preferably from about 0.5 J/g to about 35 J/g. Preferred propylene terpolymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene terpolymer can also be expressed in terms of percentage of crystallinity (i.e. % crystallinity). In one or more embodiments above or elsewhere herein, the propylene terpolymer has a % crystallinity of from 0.5% to 40%, preferably 1% to 30%, more preferably 5% to 25% wherein % crystallinity is determined by DSC. As disclosed above, the thermal energy for the highest order of polypropylene is estimated at 189 J/g (i.e., 100% crystallinity is equal to 209 J/g.).

In addition to this level of crystallinity, the propylene terpolymer preferably has a single broad melting transition. However, the propylene terpolymer can show secondary melting peaks adjacent to the principal peak, but for purposes herein, such secondary melting peaks are considered together as a single melting point, with the highest of these peaks (relative to baseline as described herein) being considered the melting point of the propylene terpolymer.

The propylene terpolymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

Differential Scanning calorimetry, or DSC, is used to determine heat of fusion and melting temperature of the propylene terpolymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed).

The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene terpolymer can have a triad tacticity of three propylene units, as measured by $^{13}$C NMR of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Pat. No. 7,232,871.

In one or more embodiments above or elsewhere herein, the propylene terpolymer can include a blend of two propylene terpolymers differing in the olefin content, the diene content, or both.

In one or more embodiments above or elsewhere herein, the propylene terpolymers can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene terpolymers can include copolymers prepared according the procedures in International Publication No. WO02/36651. Likewise, the propylene terpolymers can include polymers consistent with those described in International Publication Nos. WO03/040201, WO03/040202, WO03/040095, WO03/040233, and/or WO03/040442. Additionally, the propylene terpolymers can include polymers consistent with those described in EP1233191, and U.S. Pat. No. 6,525,157, along with suitable propylene homo- and copolymers described in U.S. Pat. Nos. 6,770,713 and 8,198,200, all of which are incorporated by reference. The propylene terpolymer can also include one or more polymers consistent with those described in EP1614699 or EP1017729.

Grafted (Functionalized) Backbone

In one or more embodiments, the propylene terpolymer can be grafted (i.e. "functionalized") using one or more grafting monomers. As used herein, the term "grafting" denotes covalent bonding of the grafting monomer to a polymer chain of the terpolymer. The grafting monomer can be or include at least one hydrolysable silane component. A preferred hydrolysable silane component can be or include vinyl siloxane. Preferred vinyl siloxanes include vinyl triethoxysilane and vinyl trimethoxysilane.

In one or more embodiments, the grafting monomer can be or include at least one organic silane having the general formula $YSiRR''_2$, wherein Y is selected from vinyl terminated radicals, each R'' is independently selected from one or more hydrolysable organic radicals; and R can be a Y radical, a R'' radical, or selected from $C_1$ to $C_{10}$ alkyl radicals (both R and R'' are bound to the silicon atom). In a particular embodiment, Y is selected from a vinyl radical, vinyl terminated $C_1$ to $C_{10}$ alkyl radicals, vinyl terminated $C_1$ to $C_{10}$ alkoxy radicals, and vinyl terminated $C_1$ to $C_{10}$ alkoxy radicals. The vinyl terminated radical is preferably selected from vinyl, allyl, butenyl, cyclohexenyl, cyclopentadienyl, and cyclohexadienyl radicals.

In one or more embodiments, the grafting monomer can be or include one or more ethylenically unsaturated carboxylic acid or acid derivatives, such as an acid anhydride, ester, salt, amide, imide, acrylates or the like. Illustrative monomers include but are not limited to: acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxymethyl methacrylate, hydroxyl-ethyl methacrylate and higher hydroxy-alkyl methacrylates and glycidyl methacrylate. Maleic anhydride is a preferred grafting monomer. The term "maleated polymer" as used herein, refers to a grafted propylene terpolymer having a maleic copolymer as its grafting monomer.

In one or more embodiments, the grafted propylene terpolymer comprises of from about 0.5 to about 10 wt % grafting monomer, more preferably from about 0.5 to about 6 wt %, more preferably from about 0.5 to about 3 wt %; in other embodiments from about 1 to about 6 wt %, more preferably from about 1 to about 3 wt %, based on the weight of the propylene-α-olefin.

Free Radical Initiator

In one or more embodiments, a free radical generating catalyst or initiator can be used to initiate the graft polymerization reaction. Illustrative initiators include but are not limited to: diacyl peroxides such as benzoyl peroxide; peroxyesters such as tert-butylperoxy benzoate, tert-butylperoxy acetate, OO-tert-butyl-O-(2-ethylhexyl)monoperoxy carbonate; peroxyketals such as n-butyl-4,4-di-(tert-butyl peroxy) valerate; and dialkyl peroxides such as 1,1-bis (tertbutylperoxy) cyclohexane, 1,1-bis(tert-butylperoxy)-3, 3,5-trimethylcyclohexane, 2,2-bis(tert-butylperoxy)butane, dicumylperoxide, tert-butylcumylperoxide, di-(2-tert-butylperoxy-isopropyl-(2))benzene, di-tert-butylperoxide (DTBP), 2,5-dimethyl-2,5-di(tert-butylperoxy)hexane, 2,5-dimethyl-2,5-di(tert-butylperoxy)hexyne, 3,3,5,7,7-pentamethyl 1,2,4-trioxepane; and the like. Most preferred free-radical initiators are organic peroxides such as benzoyl peroxide, dichlorobenzoyl peroxide, dicumyl peroxide, di-tertiary butyl peroxide. The most preferred free-radical initiator is dicumyl peroxide. Other suitable free-radical initiators are described in U.S. Pat. No. 3,646,155.

The free-radical initiator can be added at the same time as the grafting monomer, or after addition of the grafting monomer. The preferred sequence for the grafting reaction melts the propylene terpolymer, adds and disperses the grafting monomer, introduces the initiator and vents the unreacted monomer and by-products resulting from the initiator decomposition. Other sequences can feed the monomers and the initiator pre-dissolved in a solvent. Preferably, the free-radical initiator is added in an amount of from about 0.1 to about 1.0 wt % of the propylene-α-olefin, more preferably from about 0.05 to about 0.2 wt %. In one or more embodiments, the initiator concentration in the grafted polymer ranges from about 0.01 wt % to about 4 wt %, from about 0.5 wt % to about 3.8 wt %, from about 1.0 wt % to about 3.3 wt %, or from about 0.1 wt % to about 2.0 wt %.

Polyolefinic Thermoplastic Resin

In an embodiment of the present invention, the substrate may contain a polyolefin thermoplastic resin. The term "polyolefinic thermoplastic resin" as used herein refers to any material that is not a "rubber" and that is a polymer or polymer blend having a melting point of 70° C. or more and considered by persons skilled in the art as being thermoplastic in nature, e.g., a polymer that softens when exposed to heat and returns to its original condition when cooled to room temperature. The polyolefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth) acrylates and/or vinyl acetates. Preferably, the polyolefinic thermoplastic resin component is unvulcanized or non crosslinked.

In one or more embodiments, the polyolefinic thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or s syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. As noted elsewhere herein, certain polypropylenes have a high MFR (e.g., from a low of 10, or 15, or 20 g/10 min to a high of 25 to 30 g/10 min. Others have a lower MFR, e.g., "fractional" polypropylenes which have an MFR less than 1.0. Those with high MFR can be preferred for ease of processing or compounding.

In one or more embodiments, the polyolefinic thermoplastic resin is or includes isotactic polypropylene. Preferably, the polyolefinic thermoplastic resin contains one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polyolefinic thermoplastic resin and methods for making the same are described in U.S. Pat. No. 6,342,565.

The term "random polypropylene" as used herein broadly means a copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

In one or more embodiments, the random polypropylene has a 1% secant modulus of about 100 kPsi to about 200 kPsi, as measured according to ASTM D790A. In one or more embodiments, the 1% secant modulus can be 140 kPsi to 170 kPsi, as measured according to ASTM D790A. In one or more embodiments, the 1% secant modulus can be 140 kPsi to 160 kPsi, as measured according to ASTM D790A. In one or more embodiments, the 1% secant modulus can range from a low of about 100, 110, or 125 kPsi to a high of about 145, 160, or 175 kPsi, as measured according to ASTM D790A.

In one or more embodiments, the random polypropylene can have a density of about 0.85 to about 0.95 g/cc, as measured by ASTM D792. In one or more embodiments, the random polypropylene can have a density of about 0.89 g/cc to 0.92 g/cc, as measured by ASTM D792. In one or more embodiments, the density can range from a low of about 0.85, 0.87, or 0.89 g/cc to a high of about 0.90, 0.91, 0.92 g/cc, as measured by ASTM D792.

Secondary Elastomeric Component

In an embodiment of the present invention, the substrate may contain one or more secondary elastomeric components. In at least one specific embodiment, the secondary elastomeric component can be or include one or more ethylene-propylene copolymers (EP). Preferably, the ethylene-propylene polymer (EP) is non-crystalline, e.g., atactic or amorphous, but in certain embodiments the EP may be crystalline (including "semi-crystalline"). The crystallinity of the EP is preferably derived from the ethylene, and a number of published methods, procedures and techniques are available for evaluating whether the crystallinity of a particular material is derived from ethylene. The crystallinity of the EP can be distinguished from the crystallinity of the propylene terpolymer by removing the EP from the composition and then measuring the crystallinity of the residual propylene terpolymer. Such crystallinity measured is usually calibrated using the crystallinity of polyethylene and related to the comonomer content. The percent crystallinity in such cases is measured as a percentage of polyethylene crystallinity and thus the origin of the crystallinity from ethylene is established.

In one or more embodiments, the EP can include one or more optional polyenes, including particularly a diene; thus, the EP can be an ethylene-propylene-diene (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of EP or EPDM copolymers include V722, V3708P, MDV 91-9, V878 that are available under the trade name Vistalon from ExxonMobil Chemicals. Several commercial EPDM are available from DOW under the trade Nordel IP and MG grades. Certain rubber components (e.g., EPDMs, such as Vistalon 3666) include additive oil that is preblended before the rubber component is combined with the thermoplastic. The type of additive oil utilized will be that customarily used in conjunction with a particular rubber component.

Examples of the optional polyene include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1) hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene.

In another embodiment, the secondary elastomeric component can include, but is not limited to, styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE), polyisoprene rubber, polybutadiene rubber, isoprene butadiene rubber (IBR), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-alkylstyrene), preferably isobutylene/methylstyrene copolymers such as isobutylene/meta-bromomethylstyrene, isobutylene/bromomethylstyrene, isobutylene/chloromethyl styrene, halogenated isobutylene cyclopentadiene, and isobutylene/chloromethylstyrene and mixtures thereof. Preferred secondary elastomeric components include hydrogenated styrene-butadiene-styrene block copolymer (SEBS), and hydrogenated styrene-isoprene-styrene block copolymer (SEPS).

The secondary elastomeric component can also be or include natural rubber. Natural rubbers are described in detail by Subramaniam in RUBBER TECHNOLOGY 179-208 (1995). Suitable natural rubbers can be selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

The secondary elastomeric component can also be or include one or more synthetic rubbers. One suitable commercially available synthetic rubber include NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

The secondary elastomeric component can be present in a range from up to about 50 phr in one embodiment, from up to about 40 phr in another embodiment, and from up to about 30 phr in yet another embodiment. In one or more embodiments, the amount of the secondary rubber component can range from a low of about 1, 7, or 20 phr to a high of about 25, 35, or 50 phr.

Additive Oil

In an embodiment of the present invention, the substrate may contain one or more additive oils. The term "additive oil" includes both "process oils" and "extender oils". For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include mineral oil, alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectaSyn™ and Elevast™, both supplied by ExxonMobil Chemical Company.

The ordinarily skilled chemist will recognize which type of oil should be used with a particular rubber, and also be able to determine the amount (quantity) of oil. The additive oil can be present in amounts from about 5 to about 300 parts by weight per 100 parts by weight of the blend of the rubber and thermoplastic components. The amount of additive oil may also be expressed as from about 30 to 250 parts, and more desirably from about 70 to 200 parts by weight per 100 parts by weight of the rubber component. Alternatively, the quantity of additive oil can be based on the total rubber content, and defined as the ratio, by weight, of additive oil to total rubber and that amount may in certain cases be the combined amount of process oil and extender oil. The ratio may range, for example, from about 0 to about 4.0/1. Other ranges, having any of the following lower and upper limits, may also be utilized: a lower limit of 0.1/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both.

Polybutene oils are preferred. Preferable polybutene oils have an Mn of less than 15,000, and include homopolymer or copolymer of olefin derived units having from 3 to 8 carbon atoms and more preferably from 4 to 6 carbon atoms. In one or more embodiments, the polybutene is a homopolymer or copolymer of a $C_4$ raffinate. An embodiment of preferred low molecular weight polymers termed "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene").

In one or more embodiments, the polybutene processing oil is a copolymer having at least isobutylene derived units, and optionally 1-butene derived units, and/or 2-butene derived units. In one embodiment, the polybutene is a homopolymer if isobutylene, or a copolymer of isobutylene and 1-butene or 2-butene, or a terpolymer of isobutylene and 1-butene and 2-butene, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer. Commercial examples of a suitable processing oil includes the PARAPOL™ Series of processing oils or Polybutene grades or Indopol™ from Soltex Synthetic Oils and Lubricants or from BP/Innovene.

The processing oil or oils can be present at about 1 to about 60 phr in one embodiment, and from about 2 to about 40 phr in another embodiment, from about 4 to about 35 phr in another embodiment, and from about 5 to about 30 phr in yet another embodiment.

Co-agents

In an embodiment, the substrate may contain one or more co-agents. Suitable co-agents can include liquid and metallic multifunctional acrylates and methacrylates, functionalized polybutadiene resins, functionalized cyanurate, and allyl isocyanurate. More particularly, suitable co-agents can include, but are not limited to polyfunctional vinyl or allyl compounds such as, for example, triallyl cyanurate, triallyl isocyanurate, trimethylolpropane trimethacrylate, pentaerthritol tetramethacrylate, ethylene glycol dimethacrylate, diallyl maleate, dipropargyl maleate, dipropargyl monoallyl cyanurate, azobisisobutyronitrile and the like, and combinations thereof. Commercially available co-agents can be purchased from Sartomer.

In one or more embodiments, the substrate contains at least about 0.1 wt % of co-agent based on the total weight of blend. In one or more embodiments, the amount of co-agent(s) can range from about 0.1 wt % to about 15 wt %, based on the total weight of blend. In one or more embodiments, the amount of co-agent(s) can range from a low of about 0.1 wt %, 1.5 wt % or 3.0 wt % to a high of about 4.0 wt %, 7.0 wt %, or 15 wt %, based on the total weight of blend. In one or more embodiments, the amount of co-agent(s) can range from a low of about 2.0 wt %, 3.0 wt % or 5.0 wt % to a high of about 7.0 wt %, 9.5 wt %, or 12.5 wt %, based on the total weight of blend. In one or more embodiments, the amount of co-agent(s) is about 3 wt %, based on the total weight of blend.

Antioxidants

In an embodiment, the substrate may contain one or more anti-oxidants. Suitable anti-oxidants can include hindered phenols, phosphites, hindered amines, Irgafos 168, Irganox 1010, Irganox 3790, Irganox B225, Irganox 1035, Irgafos 126, Irgastab 410, Chimassorb 944, etc. made by Ciba Geigy Corp. These may be added to the elastomeric composition to protect against degradation during shaping or fabrication operation and/or to better control the extent of chain degradation.

In one or more embodiments, the substrate contains at least about 0.1 wt % of antioxidant, based on the total weight of blend. In one or more embodiments, the amount of antioxidant(s) can range from about 0.1 wt % to about 5 wt %, based on the total weight of blend. In one or more embodiments, the amount of antioxidant(s) can range from a low of about 0.1 wt %, 0.2 wt % or 0.3 wt % to a high of about 1 wt %, 2.5 wt %, or 5 wt %, based on the total weight of blend. In one or more embodiments, the amount of antioxidant(s) is about 0.1 wt %, based on the total weight of blend. In one or more embodiments, the amount of antioxidant(s) is about 0.2 wt %, based on the total weight of blend. In one or more embodiments, the amount of antioxidant(s) is about 0.3 wt %, based on the total weight of blend. In one or more embodiments, the amount of antioxidant(s) is about 0.4 wt %, based on the total weight of blend. In one or more embodiments, the amount of antioxidant(s) is about 0.5 wt %, based on the total weight of blend.

Blending and Additives

In one or more embodiments, the individual materials and components, such as the propylene terpolymer, grafting monomer, free radical initiator, and optionally the one or more polyolefinic thermoplastic resins, secondary elastomeric component, additive oil, co-agents, and anti-oxidants can be blended by melt-mixing to form a blend. Examples of machinery capable of generating the shear and mixing include extruders with kneaders or mixing elements with one or more mixing tips or flights, extruders with one or more screws, extruders of co or counter rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 RPM).

In one or more embodiments, the blend can include the propylene terpolymer in an amount ranging from a low of about 51 wt %, 60 wt %, 70 wt %, or 75 wt % to a high of about 80 wt %, 90 wt %, 95 wt %, or 99 wt %. In one or more embodiments, the blend can include the one or more polyolefinic thermoplastic components in an amount ranging from a low of about 5 wt %, 10 wt %, or 20 wt % to a high of about 25 wt %, 30 wt %, or 40 wt %. In one or more embodiments, the blend can include the secondary elastomeric component in an amount ranging from a low of about 5 wt %, 10 wt %, or 15 wt % to a high of about 20 wt %, 35 wt %, or 40 wt %. In one or more embodiments, the blend can include the one or more additives, co-agents, and/or anti-oxidants in an amount ranging from a low of about 0.001 wt %, 0.01 wt %, or 0.1 wt % to a high of about 0.5 wt %, 1.0 wt %, 2.5 wt %, or 5.0 wt %. Unless otherwise noted herein, all weight percents (wt %) are based on the total weight of the blended composition.

In one or more embodiments, the co-agents, antioxidants, and/or other additives can be introduced at the same time as the other polymer components or later downstream in case of using an extruder or Buss kneader or only later in time. In addition to the co-agents and antioxidants described, other additives can include antiblocking agents, antistatic agents, ultraviolet stabilizers, foaming agents, and processing aids. The additives can be added to the blend in pure form or in master batches.

Conventional propylene terpolymers are disclosed, for example, in U.S. Pat. Nos. 6,525,157, 6,500,563, and 6,342,565, each of which is herein incorporated by reference in its entirety. U.S. Pat. No. 6,342,565, in particular, discloses a soft, set-resistant, annealed fiber comprising a blend of polyolefins. Other conventional compositions are described in International Publication Nos. WO04/014988, WO03/040233, WO00/69963, EP946640, EP964641, EP969043, and EP1098934, each of which is herein incorporated by reference in its entirety. EP1003814 and U.S. Pat. No. 6,642,316, each of which is herein incorporated by reference in its entirety, disclose two-component blends of small amounts of isotactic polypropylene and an ethylene based elastomer. EP374695 discloses two component blends using 40 wt % or less of the propylene-based copolymer. EP0510559, International Publication No. WO2005/003199, U.S. Pat. No. 6,472,015, U.S. Pat. No. 6,455,637, U.S. Pat. No. 5,844,009, U.S. Pat. No. 5,883,145, U.S. Patent Publication 2002/0151647 and U.S. Pat. No. 6,794,453, each of which is herein incorporated by reference in its entirety, disclose grafted polyethylene-based compositions having at least 50 wt % ethylene derived units.

One problem with using polyethylene-based polymers in forming graft polymers is that the peroxides that are used to initiate the grafting also act as a cross-linking agent towards polyethylene. Thus, what results from contacting peroxides with polyethylene-based polymers is a highly cross-linked polymer with higher molecular weight, and high viscosity, which is even worse when high silane levels, which necessitate the use of high levels of peroxides, are required to get higher performance. Such compositions are not suitable for stretchable application as they lack stretchability at room and elevated temperatures due to its crystalline nature.

The article S. Yang et al., "*Mechanism of a One-Step Method for Preparing Silane Grafting and Cross-linking Polypropylene*" in 47 POLYMER ENGINEERING AND SCIENCE, 1004 (2007), which is incorporated herein by reference, discloses the grafting of silane to polypropylene, thus forming moisture cross-linkable propylene homopolymer. Other related references include U.S. Pat. Nos. 3,646,155, 7,464,696, 8,013,093, 7,928,165, and 7,605,217, each of which is incorporated herein by reference.

Preparing Grafted Propylene Terpolymers

In an embodiment, a grafted propylene terpolymer can be used to prepare the article. The grafted propylene terpolymer can be prepared using conventional techniques, for example, the graft polymer can be prepared in solution, in a fluidized bed reactor, or by melt grafting. A preferred grafted polymer can be prepared by melt blending in a shear-imparting reactor, such as an extruder reactor. Single screw but preferably twin screw extruder reactors such as co-rotating intermeshing extruder or counter-rotating non-intermeshing extruders but also co-kneaders such as those sold by Buss are especially preferred.

In at least one specific embodiment, the propylene terpolymer, grafting monomer, free-radical initiator, and optionally one or more polyolefinic thermoplastic resins, and optionally one or more elastomers can be reacted at a temperature above the melting point of the propylene terpolymer under conditions at which the propylene-based polymer is subjected to mechanical shearing, using processes known to those skilled in the art. The grafted propylene terpolymer can be subsequently melt-processed (such as by a Brabender or single or double screw extruder that can apply a shearing force on the molten material), in one embodiment with an amount of one or more condensation catalysts that facilitate the cross-linking reaction of the grafted copolymer after fabricating into articles of use. The condensation catalyst (or "catalyst") can be selected from the group consisting of organic bases, carboxylic acids and organometallic compounds including organic titanates and complexes or carboxylates of lead, cobalt, iron, nickel, zinc and tin. Preferably, the catalyst is selected from dibutyltin dilaurate, dibutyltin diacetate, dibutyltin octanoate, dioctyltin maleate, dibutyltin oxide and titanium compounds such as titanium-2-ethylhexoxide. A preferred condensation catalyst includes dibutyl tindilaurate, though any material that will catalyze the condensation reaction is suitable. The condensation catalyst is preferably added in an amount of from 0.01 to 5 wt %, and from 0.01 to 3 wt % in another embodiment, more preferably 0.05 to 2 wt %, and most preferably 0.1 to 1 wt % (by weight of the grafted propylene terpolymer). In one or more embodiments, the amount of condensation catalyst ranges from about 0.01 wt % to about 5 wt %, from about 0.5 wt % to about 4.2 wt %, from about 1.0 wt % to about 3.3 wt %, or from about 0.1 wt % to about 2.0 wt %, based on total weight of the blend composition.

Subjecting the composition thus produced to moisture, at an elevated temperature of greater than about 20° C., or greater than about 30° C., or greater than about 40° C. or greater than about 50° C., preferably of from 20° C. to 85° C., will induce crosslinking of the silane groups via a combined hydrolysis and condensation reaction. Atmospheric moisture is usually sufficient to permit the crosslinking to occur, but the rate of crosslinking may be increased by the use of an artificially moistened atmosphere, or by immersion in liquid water. For example, crosslinking is induced by a relative humidity of at least about 50%, or at least about 60%, or at least about 75% for at least about 10 hours, or at least about 25 hours, or at least about 50 hours, or at least about 75 hours. Preferably crosslinking is induced by exposure to at least about 90% relative humidity for approximately 100 hours. Also, subjecting the composition to heat and moisture will accelerate the crosslinking reaction. Most preferably, crosslinking is effected at a temperature of at least about 50° C. and most preferably by exposing the composition to a temperature of about 85° C. and a relative humidity of about 90% for approximately 100 hours. The end result is a cross-linked propylene terpolymer (or "cross-linked copolymer blend").

In at least one other specific embodiment, the propylene terpolymer, grafting monomer, free-radical initiator, and condensation catalyst, and optional polyolefinic thermoplastic resins, elastomers, and/or additives, can be pre-blended and passed through an extruder at a temperature above the melting point of the propylene-based polymer and decomposition temperature of the peroxide, in order to graft the silane onto the propylene-based polymer. Thus is produced the grafted propylene terpolymer (or copolymer blend composition). The grafted polymer can then be passed through a multi-strand die, cooled, and subsequently chopped into pellets with a strand pelletizer and dried. The pellets can then be melted and fabricated into a formed article that can be exposed to moisture at any time, preferably at a temperature above about 50° C. and most preferably by exposing the composition to a temperature of about 85° C. and a relative humidity of about 90% for approximately 100 hours, to effect crosslinking of the material.

Cured Products

Formed articles include extruded articles, such as pellets, fabric, or films, and articles made therefrom, such as coatings, nonwoven fabrics, and woven fabrics. Preferably the articles are at least partially crosslinked or cured. Preferably, the formed article is at least partially crosslinked or cured so that the article becomes heat-resistant. As used herein, the term "heat-resistant" refers to the ability of a polymer composition or an article formed from a polymer composition to pass the high temperature heat-setting and dyeing tests described herein. As used herein, the terms "cured", "crosslinked", "at least partially cured", and "at least partially crosslinked" refer to a composition having at least 2 wt % insolubles based on the total weight of the composition. In one or more embodiments, the compositions described herein can be cured to a degree so as to provide at least 3 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % insolubles using Xylene as the solvent by Soxhlet extraction. It is appreciated that any means of crosslinking known in the art can be used in the present invention, including electronic beam, ultra-violet radiation, gamma radiation, moisture curing, and/or chemical cross-linking.

In a particular embodiment, the crosslinking is accomplished by exposing the grafted elastomeric composition to water ("moisture cure"). The grafted, elastomeric composition can be moisture cured after shaping or extruding the article or before shaping or extruding the article.

C. Applications of Articles Comprising Elastomeric Compositions and Adhesives

The adhesive formulations disclosed herein can be used in various nonwoven construction applications including, but not limited to, hygiene products such as baby diapers, adult diapers, incontinence products or devices, absorbent articles, panty liners, and sanitary napkins. The adhesive formulations disclosed herein can also be used in various nonwoven elastic applications including, but not limited to, hygiene products such as wound care dressings for human or veterinary medicine. As the hygiene industry is continuing to move to products, articles, and devices with thinner gauge films and thinner nonwoven materials, the industry is continuing to seek adhesive formulations that can be applied over a broad application temperature range, for versatility of an adhesive formulation in more than one end use product, article, device, and combinations thereof. The adhesive formulations described herein, having a high polymer load, provide a desired combination of physical properties such as stable adhesion over time indicative of broad application temperature ranges and machine coatability and therefore can be used in nonwoven applications including hygiene products disclosed herein. It should be appreciated that the adhesive formulations of the present disclosure, while being well suited for use in hygiene nonwoven products, may also find utility in other applications as well.

In embodiments, one or more adhesive formulations can be used in baby or adult diapers, incontinence product, or training pants. One or more adhesive formulations disclosed herein may be used alone or in combination with other additives for affixing and or securing different layers or different components of a disposable diaper, incontinence product, or training pant construction. The construction of a diaper, incontinence product, or training pant can be accomplished in any conventional manner known in the art.

In a common construction, a diaper, incontinence product, or training pant includes a pant body having a front section, a back section, a crotch section, two elastic sections each having a front elastic member and a back elastic member, two leg openings and a waist opening, a backsheet and a topsheet, a waistband and two leg bands, a waistborder and two leg borders, an absorbent article, and optionally a fastening device having a quick-remove peelable layer on the fastening device when the diaper, incontinence product, or training pant is not in use. Certain non-limiting examples of using one or more adhesive formulations of the present disclosure in a diaper, incontinence product, or training pant include attaching the sides of the front section to the back section, attaching the crotch section to the front section and the back section, attaching the topsheet to the front layer, attaching the backsheet to the back layer, attaching the absorbent article to the crotch section, attaching each of the leg bands to each of the leg openings of the topsheet and backsheet, attaching each of the leg borders to each of the leg bands, attaching the waistband to the top section of the top sheet and the top section of the backsheet, attaching the waistborder to the waistband, attaching the quick-remove peelable layer to the fastening device, and attaching the fastening device to the waistborder.

In embodiments, one or more adhesive formulations can be used in sanitary napkins or panty liners. As used herein, the term "sanitary napkin" refers to an externally positioned, disposable absorbent article in the form of a catamenial device, configured for the absorption of body fluids such as menses. As used herein, the term "panty liner" refers to an externally positioned, disposable absorbent article having a thinner gauge and a narrower width than a sanitary napkin that can be configured for the absorption of body fluids. The construction of a sanitary napkin or panty liner can be accomplished in any conventional manner known in the art.

In a common construction, a sanitary napkin or panty liner includes a front body having an absorbent article, back body to be positioned on the undergarment of the wearer, a quick-remove peelable protectable layer covering the back body when the sanitary napkin or panty liner is not in use, optionally two side wing projections on either side of the front body and a quick-remove peelable protective layer covering each of the two side wing projections when the sanitary napkin or panty liner is not in use. Certain non-limiting examples of using one or more adhesive formulations of the present disclosure in a sanitary napkin or panty liner include attaching an absorbent article to the front body, attaching the front body to the back body, attaching a quick-remove peelable protective layer to the back body, attaching the two side wing projections on the front body, and attaching a quick-remove peelable protective layer to each of the two side wing projections on the front body.

In embodiments, one or more adhesive formulations can be used in a wound care dressing for human or veterinary medicine. As used herein, the term "wound care dressing" refers to wet, dry, or a combination of wet and dry, gauze used at or around a wound site to help wound healing. The construction of a wound care dressing can be accomplished in any conventional manner known in the art. In a common construction, a wound care dressing includes a top layer that is visible to the patient and a bottom layer that is in contact with the wound, an absorbent article, an adhesive coating the bottom layer, and a quick-remove peelable protective layer covering the bottom layer when the wound care dressing is not in use. Certain non-limiting examples of using one or more adhesive formulations of the present disclosure in a wound care dressing include attaching an absorbent article to the bottom layer, attaching the bottom layer to the top layer, attaching the quick-remove peelable protective layer to the bottom layer, and attaching the adhesive coating to the bottom layer.

In an embodiment of the present invention, the adhesive composition and the elastomeric composition are blended to form an article. The adhesive composition in such an article may be present in the amount of less than about 20 wt %, preferably about 5 wt % to about 20 wt %, or 10 wt % to about 20 wt %, or about 15 wt % to about 20 wt %.

EXAMPLES

In a pilot plant, propylene-ethylene copolymers were produced by reacting a feed stream of propylene with a feed stream of ethylene in the presence of a metallocene catalyst to produce a polymer blend in accordance with the method disclosed herein and in International Publication No. WO2013/134038. The polymer blend PB1 of the example of the invention has an ethylene content of about 11.5 wt %, a melt viscosity at 190° C. of about 7175 cP, a Melt Flow Rate (MFR) (230° C., 2.16 kg) of about 2,000 g/10 min, a Heat of Fusion of about 25 J/g, a Shore Hardness C of about 25, a Melting Temperature of about 104° C., and a Crystallization Temperature of about 42° C. The polymer blend PB2 of the example of the invention has an ethylene content of about 12.4 wt %, a melt viscosity at 190° C. of about 4110 cP, a Melt Flow Rate (MFR) (230° C., 2.16 kg) of about 3,500 g/10 min, a Heat of Fusion of about 23 J/g, a Shore Hardness C of about 29, a Melting Temperature of about 95° C., and a Crystallization Temperature of about 27° C. The invention is not limited to PB1 or PB2 as the polymer blend.

To prepare the propylene terpolymers of the present invention, two different streams, each with a ratio of propylene, ENB, and ethylene was fed into two reactors in accordance with the method disclosed herein. The propylene terpolymers of the present invention are listed in Table 1. The invention is not limited to the terpolymers of Table 1. All of the terpolymers of Table 1 were then compounded with 3 wt % SR 350 (a crosslinking enhancer/co-agent), Irgafos 168 (an antioxidant), and 5 wt % PP 5341 (a polypropylene homopolymer). Injection molding techniques known in the art were then used to prepare plaques of the terpolymer and compounded additives. The injection molded plaques were then crosslinked by e-beam irradiation (45 kGy and 60 kGy from Ebeam Services).

TABLE 1

| Propylene Terpolymer | Ethylene Content, % | Melt Flow Rate, g/10 min | Diene Content, % |
| --- | --- | --- | --- |
| PT1 | 13.5 | 4.3 | 2.4 |
| PT2 | 14.2 | 4.2 | 1.6 |
| PT3 | 14.5 | 8.2 | 2.5 |
| PT4 | 17.0 | 7.4 | 1.8 |

To prepare the adhesive composition of the present invention, various amounts of tackifiers and other additives were blended with one of the polymer blends described above (PB1 or PB2). The adhesive compositions of the present invention are listed in Table 2. The invention is not limited to the adhesives in Table 2.

TABLE 2

| Polymer Blend (wt %) | Tackifier (wt %) | Other Additives (wt %) | Adhesive Viscosity, 140° C. (cP) |
| --- | --- | --- | --- |
| 50% PB1 | 40% Escorez ™ 5400 | 10% Krystol 550 | 6,600 |
| 45% PB1 | 40% Escorez ™ 5380 | 0.2% Irganox 1010/ 10% Krystol 550/ 5% Kraton FG 1901 | 7,600 |
| 40% PB1 | 40% Escorez ™ 5380 | 0.2% Irganox 1010/ 10% Krystol 550/ 5% Kraton FG 1901/ 5% Polywax 2000 | |
| 70% PB2 | 20% Escorez ™ 5400 | 0.2% Irganox 1010/ 10% Polywax 2000 | 7,600 |
| 65% PB2 | 20% Escorez ™ 5400 | 0.2% Irganox 1010/ 5% Krystol 550/ 10% Polywax 2000 | |

The application temperature was set to 140° C., the speed was fixed at 75 feet/minute and the add-on to 6 g/m². "Application Temperature" is the temperature, in ° C., at which an adhesive formulation is applied to bond two substrates together, where the substrates can be the same or different. Each adhesive of Table 2 was separately tested on each of the crosslinked injection molded plaques.

To evaluate the adhesive properties of the resultant article, the adhesive-covered plaques were aged for 24 hours at room temperature and pulled at 180° direction to evaluate the adhesion strength. As used herein, the term "room temperature" is used to refer to the temperature range of about 20° C. to about 23.5° C. For all samples, the adhesive composition indicated strong adhesive strength to the polymer plaque. Accordingly, the adhesive formulations of the present invention can be used in construction/laminated nonwovens and for elastic nonwovens alike, preferably for nonwoven construction articles, products, and devices. The formulations may also find utility in other aspects of nonwoven construction.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

We claim:
1. An article comprising a blend of
   (a) at least one propylene terpolymer comprising propylene derived units, one or more dienes, and one or more $C_2$ or $C_4$ to $C_{20}$ alpha-olefins, where the $C_2$ or $C_4$ to $C_{20}$ alpha-olefin content is less than about 35 wt % of the propylene terpolymer; and

(b) an adhesive composition, comprising
  a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer based on at least one property selected from the group consisting of comonomer content, heat of fusion, crystallinity, branching index, weight average molecular weight, and polydispersity, and wherein the polymer blend is present in the amount of about 20 to about 80 wt % of the adhesive composition.

2. The article of claim 1, further comprising one or more secondary elastomeric components, one or more polyolefinic thermoplastic resins, or at least one of each.

3. The article of claim 1, wherein the polymer blend has a melt flow rate of greater than about 1,000 g/10 min to less than about 10,000 g/10 min.

4. The article of claim 1, wherein the adhesive composition is present in the amount of about 5 wt % to about 20 wt % based on the article.

5. The article of claim 1, wherein the propylene terpolymer is crosslinked.

6. The article of claim 1, wherein the propylene terpolymer has a melting point of about 100° C. or less.

7. The article of claim 1, wherein the propylene terpolymer comprises from about 0.2 to about 4 wt % 5-ethylidene-2-norbornene (ENB) based on the propylene terpolymer.

8. The article of claim 1, wherein the polymer blend is present in the amount of about 40 to about 70 wt % of the adhesive composition.

9. The article of claim 1, wherein the adhesive composition further comprises a tackifier, and wherein the tackifier has a softening point of about 90° C. to about 120° C.

10. The article of claim 1, wherein the adhesive composition further comprises a wax in the amount of up to about 15% by weight of the adhesive composition.

11. The article of claim 1, wherein the adhesive composition further comprises an oil in the amount of up to about 30% by weight of the adhesive composition.

12. The article of claim 1, wherein the adhesive composition further comprises a maleated polymer in the amount of up to about 10% by weight of the adhesive composition.

13. The article of claim 1, wherein the article is a film or fabric.

* * * * *